Dec. 24, 1968 P. V. POPAT 3,418,171
ELECTROCHEMICAL POWER SUPPLY SYSTEMS
Filed Dec. 15, 1966 2 Sheets-Sheet 1
FIG.1.
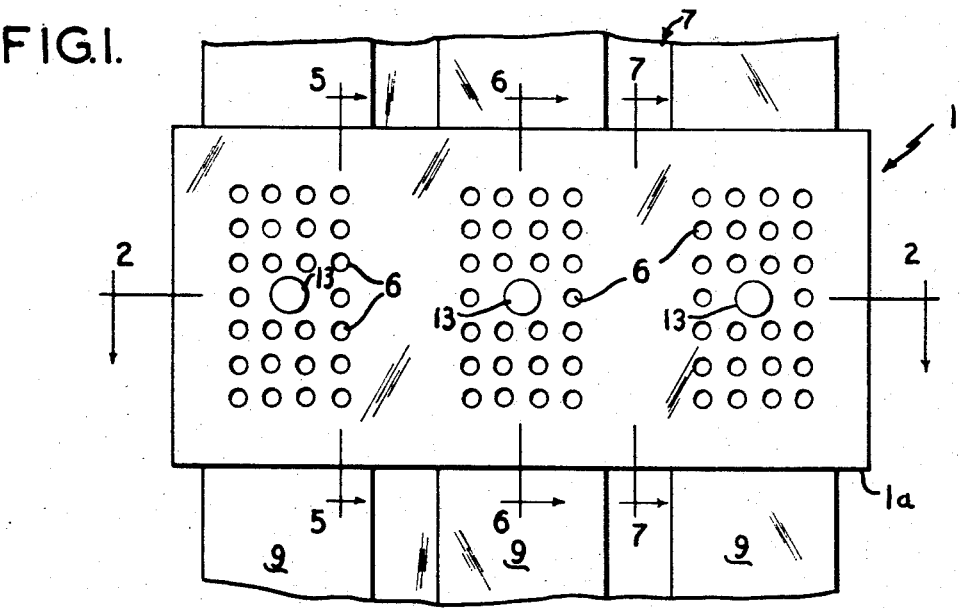
FIG.2.
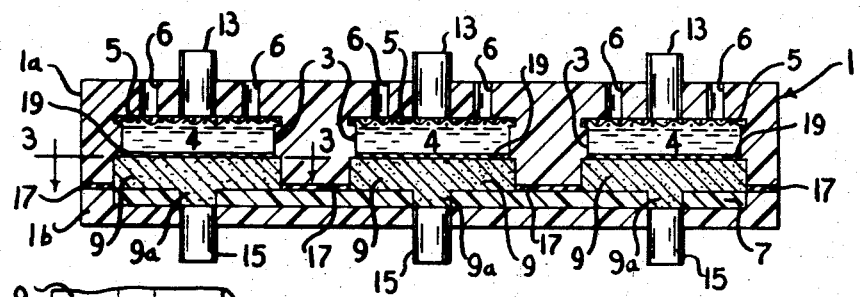
FIG.3.
Pranjivan V. Popat,
Inventor.
Koenig, Senniger, Powers and Leavitt,
Attorneys.

Dec. 24, 1968    P. V. POPAT    3,418,171

ELECTROCHEMICAL POWER SUPPLY SYSTEMS

Filed Dec. 15, 1966    2 Sheets-Sheet 2

United States Patent Office 3,418,171
Patented Dec. 24, 1968

3,418,171
ELECTROCHEMICAL POWER SUPPLY SYSTEMS
Pranjivan Velji Popat, Attleboro, Mass., assignor to Texas Instruments Incorporated, Dallas, Tex., a corporation of Delaware
Filed Dec. 15, 1966, Ser. No. 602,072
12 Claims. (Cl. 136—100)

ABSTRACT OF THE DISCLOSURE

Electrochemical power supplies are described which include a housing with several compartments, each containing a body of aqueous electrolyte. Each compartment has an electrically conductive cathode permeable to the passage of air or oxygen therethrough while being substantially impermeable to the passage of electrolyte. A surface of each cathode is in electrolytic contact with the electrolyte and each compartment has passages to provide a supply of oxygen-containing gas to an opposite surface of the cathode. Each compartment also has an elongate electrically conductive porous strip of anode material having at least one surface adapted for electrolytic contact with the electrolyte in the respective compartment. Means are provided for concurrently moving the strips of anode material relative to respective cathodes in the respective compartments. Electrical terminals are connected to each cathode, and each compartment also has electrical terminal means for maintaining electrical contact with the individual strips of anode material during concurrent movement thereof relative to said cathodes. These terminals may be interconnected so that the cells in the various compartments are serially or parallel connected to an electrical load.

---

This invention relates to electrochemical power supply systems, and more particularly to electrochemical power supplies for producing electrical energy in which anode material is moved relative to the cathode and through a body of an aqueous electrolyte.

Among the several objects of the invention may be noted the provision of electrochemical power supplies which have high energy density (at least approximately 50 watt hours/lb.) on a volume, weight and cell basis and will operate at high current densities; the provision of such power supplies in which the energy required to effect relative movement of the anode and cathode is quite small; the provision of power supplies of the type described which have low internal resistances and are capable of high discharge rates; the provision of power supply cells which will operate effectively over a wide range of temperatures, and in which explosion hazards are eliminated; the provision of such power supplies which are efficient in terms of the ratio of discharge energy to charging energy and are conveniently rechargeable for use over many cycles of operation; the provision of power supplies of the type described which are unharmed by high rates of charge or discharge, or by long periods of standing in a charged or uncharged condition; the provision of power supplies which are both compact and versatile in use, and may conveniently be used to supply power at many different potential and current levels; and the provision of methods for electrochemically producing electrical energy which are simple, economical and efficient. Other objects and features will be in part apparent and in part pointed out hereinafter.

The invention accordingly comprises the constructions hereinafter described, the scope of the invention being indicated in the following claims.

Figure 4:
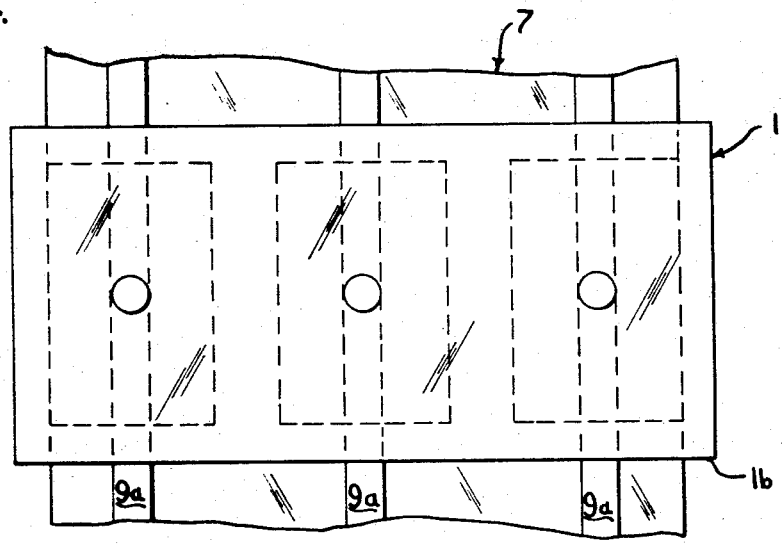
Figure 5:
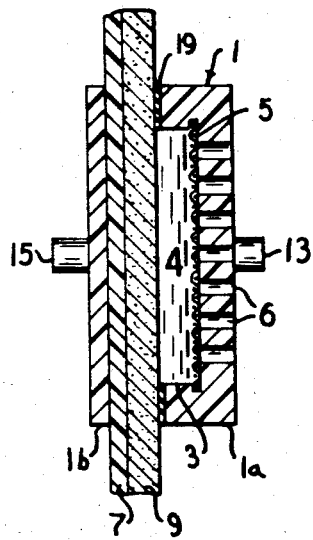
Figure 6:
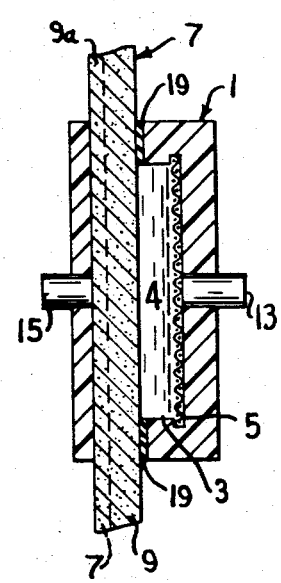
Figure 7:
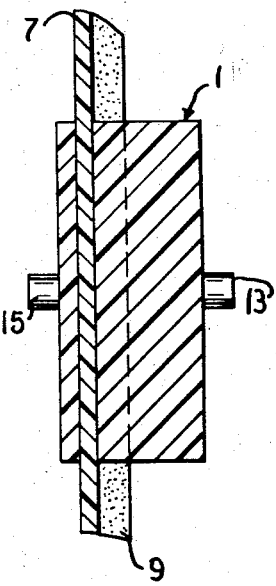

In the accompanying drawings, in which one of various possible embodiments of the invention is illustrated, FIG. 1 is a top plan view of a power supply of the present invention;
FIG. 2 is a transverse cross section taken on line 2—2 of FIG. 1;
FIG. 3 is a section taken on line 3—3 of FIG. 2;
FIG. 4 is a bottom plan view of an exemplary power supply of the invention; and
FIGS. 5–7 are sections taken respectively on lines 5—5 to 7—7 of FIG. 1.

Corresponding reference characters indicate corresponding parts throughout the several views of the drawings.

In copending application Ser. No. 535,452, filed Mar. 18, 1966, high energy density electrochemical power supplies were disclosed. These supplies represent a marked departure from generally accepted conventional electrochemical cell concepts and technology by emphasizing energy density-volumetric considerations in the selection of anode materials; in utilizing as a cathode an air electrode; in having the total projected area of the anode in contact with the electrolyte at least equal, and preferably several times as great as, the total projected area of the cathode contacting the electrolyte; and in having the total developed area of the anode in contact with the electrolyte at least approximately ten times, and preferably many times (e.g., 100,000 or more), that of the cathode in contact with the electrolyte. The term projected area means the total superficial or extrinsic area of electrode contacted by the electrolye disregarding the exterior and interior characteristics of the porous electrode structures. The expression total developed area refers to the total active or instrinsic area of electrode contacted by the electrolyte, taking the porous nature of the electrode structure into consideration. In a conventional cell the total projected area of the anode is substantially equal to that of the cathode, and the total developed area of one electrode is at best only a few times greater than that of the other electrode. In the aforesaid application the stored electrochemical capacity of the anode is many times greater than that of the cathode, again in sharp contrast with conventional cells in which the stored electrochemical capacities of the anode and cathode are substantially of the same order.

In copending application Ser. No. 572,506, filed Aug. 15, 1966, the anode and cathode components and relationships of the aforesaid application are utilized, as well as other anode materials, in providing electrochemical power supply systems in which the anode material is moved relative to the cathode and through a body of aqueous electrolyte to operate at high current densities over extended periods of time. These power supplies may be operated as a primary cell, or as a secondary cell in which event means for recharging the supply is provided. However, there are numerous commercial applications for such power supplies in which the potential or current levels provided by the supplies of the aforesaid applications must be exceeded. In accordance with the present invention, power supplies have been developed which supply electrical power at increased current and/or potential levels, and which have novel structural features which provide advantageous results.

Briefly, this invention in its broader aspects relates to electrochemical power supplies which include a housing having a plurality of compartments, each of the compartments including a body of aqueous electrolyte. Each of the compartments has positioned therein an electrically conductive cathode permeable to the passage of air and oxygen therethrough while being substantially impermeable to the passage of electrolyte. The cathode has a surface in electrolytic contact with the electrolyte and each compartment is provided with passages to provide a supply of oxygen-containing gas to an opposite surface of the cathode. Also included is a supply of a plurality of elongate electrically conductive porous strips of anode material with each strip having at least one surface adapted for electrolytic contact with the body of electrolyte in a respective compartment and being spaced away from the respective cathode in that compartment. Means are provided for concurrently moving said strips of anode material relative to respective cathodes in the respective compartments. Respectively electrically connected to each cathode is a first terminal means, while second electrical terminal means are provided for each compartment for maintaining electrical contact with the individual strips of anode material during concurrent movement thereof relative to said cathodes. The individual anode material-cathode cells, constituted by each compartment and its respective cathode and anode material strips, may be serially or parallel connected to an electrical load by appropriate interconnection of first and second electrical terminals.

More specifically the novel electrochemical power supply systems of this invention employ metal-air couples or cells in which the cathodes, or positive polarity electrodes, are microporous or permeable to air and oxygen but not to aqueous alkaline or acid electrolytes. These air electrodes or cathodes are quite thin, preferably in the order of 5–25 mils. Exemplary useful air electrodes are disclosed, for example, in the aforesaid applications, and are commercially available under the trade designations AA-1, AB-4, AB-6 and AB-X from American Cyanamid Co. of Stamford, Conn. These air electrodes have a capacity which is practically infinite, i.e., the capacity of a cell using such a cathode can be increased by increasing the available anode material in contact with the electrolyte and providing sufficient oxygen at the cathode, such as by a forced air supply.

The anode, sometimes referred to as a counterelectrode, is therefore the principal significant limiting factor in increasing the capacity of these power supply cells. If conventional practice in battery technology were followed and the facing or total projected areas and developed areas of the anode and cathode were made substantially the same, the capacity of such a cell would not be fully realized. To increase the surface area of the anode or counterelectrode by increasing the thickness of a porous anode has distinct limitations due to concentration polarization and the rate of diffusion of the conducting ions in and out of the counterelectrode. It is preferred to keep the diffusion paths quite small and the maximum thickness of the counterelectrode in the order of about 100 mils and preferably about 50 mils. Thus the anode of the power supplies of the present invention preferably has a projected area in contact with the electrolyte which is at least equal to the electrolyte-contacting area of the air cathode and a developed area which is many times greater than that of the cathode.

The metals useful as anodes or counterelectrodes of this invention may be of two types, depending on whether a secondary or rechargeable power supply is desired, or whether a nonrechargeable supply is satisfactory. In both types of systems the anodes preferably have high volumetric energy density characteristics, but in rechargeable systems of this invention the anode should also possess desirable characteristics relative to solubility and corrosion factors in an aqueous electrolyte. In accordance with this invention the power supply anodes for the rechargeable systems of this invention include zinc, cadmium, cobalt, iron, vanadium, chromium, molybdenum and tungsten. These anodes are porous and may include an electrically conductive grid or mesh of an inactive metal, such as nickel, supporting the active anode material, or these anodes may be self-supporting.

The electrolyte may either be an aqueous alkaline or acidic solution having a concentration of between about 5–50% by weight and preferably about 20–30%, and may be in free-flowing, solid or paste form. Examples of alkaline electrolytes include alkali hydroxides such as potassium, sodium and lithium hydroxides, while exemplary acidic electrolytes include sulphuric, phosphoric, nitric and hydrochloric acids.

The power supplies of this invention produce electrical energy by electrochemical reactions involving, during discharge of the cell, a molecular dissociation wherein anode metal ions (i.e., cations) are formed at the anode or counterelectrode - electrolyte interfaces and migrate through the electrolyte toward the cathode-electrolyte interface with free electrons being produced at the anode terminal. Concurrently, the oxygen molecules supplied from air or oxygen diffusing through the air permeable cathode are reduced to hydroxyl ions which migrate toward the anode, free electrons being supplied through an electrically conductive external load circuit by electronic current flow from anode to cathode. During discharge therefore, metal ions are formed at the anode and water is simultaneously being consumed as hydroxide ions being produced with the concurrent consumption of oxygen at the cathode. During charging of the rechargeable supplies disclosed herein, the electrochemical processes are reversed and metal ions are redeposited on the counterelectrode whereas oxygen is produced at the air electrode. The oxidation reaction at the anode is represented by:

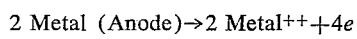

while the reduction reaction at the cathode is:

The overall charge and discharge reaction of the cell is:

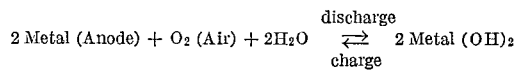

It will be noted that the reaction at the cathode during discharge involves reduction of each molecule of oxygen to four hydroxyl ions and the utilization of all four electrons, rather than the partial reduction of oxygen molecules to perhydroxyl ions wherein the $O_2$ bond is not split and which involves the utilizing of only two of the four available oxygen electrons. The latter reaction, therefore, utilizes only one-half the possible coulombic efficiency while the former utilizes substantially the entire coulombic efficiency. This hydroxyl mechanism at the cathodes of these novel electrochemical power supplies is effected by the presence of a catalyst at the cathode-electrolyte interface which promotes or utilizes the full use of oxygen, i.e., the reduction of oxygen to hydroxyl. Such catalysts are of the platinum type, viz., platinum black particles which are supported on thin screens or grids of inactive metal bonded and waterproofed with a synthetic resin (e.g., tetrafluoroethylene polymers or other useful polymeric synthetic resin materials such as polyethylene, polypropylene, polystyrene, polyacrylonitrile and polyvinylchloride) air or oxygen-permeable membrane which is substantially impermeable to the aqueous electrolyte. The Faraday or coulombic efficiency of these power supply units is quite high. For example, a cell of the present invention will have a coulombic efficiency of at least 60–70%. The catalyst material may be extended by use of certain other finely divided material such as boron and/or titanium carbides.

Referring now more particularly to the drawings, an exemplary electrochemical power supply of the present invention comprises a housing 1 with several chambers or compartments 3, each containing a body of an aqueous electrolyte 4. A cathode 5 is secured in the upper part of each chamber. As described above, cathode 5 is an electrically conductive material permeable to the passage of air or oxygen therethrough while being substantially impermeable to the passage of electrolyte. Typically, the electrode constituting cathode 5 comprises a platinum black catalyst supported in a synthetic resin membrane bonded to a fine mesh screen of a metal such as nickel or tantalum, and is about 6–7 mils in thickness, and carries 5–10 grams of platinum black per square foot. The inner surface of cathode 5 is in electrolytic contact with the aqueous electrolyte while the outer cathode surface is exposed to oxygen or any oxygen-containing gas, such as air, supplied via passages 6 at a pressure at least equal to ambient atmospheric pressure.

A carrier member 7 (preferably of a thin flexible synthetic resin material which is unaffected by the electrolyte 4) constitutes a supply of several strips 9 of electrically conductive porous anode material in tape or other elongate physical form, which is positioned for movement through each of the compartments 3. The strips 9 are preferably T-shaped in transverse cross section and are secured by any conventional bonding system to carrier member or tape 7 in a spaced parallel relation extending longitudinally of the tape on one face thereof. Tape 7 is slotted throughout its length to accommodate legs 9a of strips 9.

Each cathode 5 is provided with an electrical terminal 13 projecting through the upper wall of each compartment. A second electrical terminal constituted by a brush 15 is mounted in each bottom compartment wall in alignment with the respective carrier slots and leg 9a of each anode strip, thereby to maintain electrical contact with the anode material during movement of the carrier 7 through the compartments 3 and relative to the respective cathodes 5. Housing 1 includes two separable sections 1a and 1b, with sliding liquid seals 17 and 19 of any conventional liquid-sealing gasket material between the opposing portions of the sections and the top surfaces of strips 9, respectively.

The porous anode material strips may be formed of particles of zinc, iron, cobalt, etc. powder sintered to a supporting mesh, the fabrication of such porous anode material being described in further detail in the aforesaid copending applications and in other copending applications Ser. No. 368,055, filed May 18, 1964, and Ser. No. 504,604, filed Oct. 24, 1965. It is to be noted that because of the thicker and higher porosity characteristics of the anode 9, the developed area of the anode in contact with the electrolyte is many times greater than that of the cathode.

It is preferred that the anode material have its pores carry particles of the electrolyte, such as potassium hydroxide, in dry particulate form. Such anode material, when moved through bodies of water in the compartments, will form adequately concentrated bodies of aqueous electrolyte. The inclusion of the electrolyte in the supply of anode material is particularly advantageous since during discharge hydroxyl ions are consumed at the anode to form metal hydroxide and thus under normal circumstances the electrolyte immediately adjacent the anode becomes more dilute as the discharge reaction continues. However, where the electrolyte in dry form is carried by the anode, its dissolution thus replenishes the depleted hydroxyl ion and provides a concentration profile which is highly desirable.

Any customary electrical load may be energized from the power supplies of this invention by interconnecting it with the terminals 13 and 15 of the individual cells constituted by the respective cathode 3 and the spaced-apart anode strips 9 of each compartment. For extra high-current low-voltage loads the cathode terminals 13 are commonly connected to the positive polarity terminal of the load and the brush electrodes 15 are connected commonly to the negative polarity terminaal of the load. For loads which require higher than single cell voltages, the individual cells are serially connected.

Any conventional means such as a small electrical motor and drive (not shown) is employed to move the carrier member through the compartments and to control the speed of travel, if desired, to a value which is a function of the load demand, e.g., an increase in speed of travel in response to an increase in load current. It will be noted that the energy required to move the tape through the electrolyte is minimal and may be conveniently supplied from the power supply with little parasitic loading effect. Moreover, as the solvent water need not be stored and the anode material is the only component that would eventually need replacing, the power supply systems of this invention are quite compact in size and have great versatility of use.

For rechargeable systems of the present invention, a second electrical motor and drive (not shown), or a single reversible motor, is used to move carrier member 7 back through the compartment, recharging being effected as used anode material is returned through the compartments by connecting a D.C. supply source of appropriately connected terminals 13 and 15.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:
1. An electrochemical power supply comprising:
   a housing having a plurality of compartments, each of said compartments including a body of aqueous electrolyte;
   each of said compartments having positioned therein an electrically conductive cathode permeable to the passage of air or oxygen therethrough while being substantially impermeable to the passage of electrolyte, said cathode having a surface in electrolytic contact with said electrolyte, each compartment having passages to provide a supply of oxygen-containing gas to an opposite surface of the cathode;
   a supply of a plurality of elongate electrically conductive porous strips of anode material, each strip having at least one surface adapted for electrolytic contact with said body of electrolyte in a respective compartment and being spaced away from the respective cathode in that compartment;
   means for concurrently moving said strips of anode material relative to respective cathodes in said respective compartments;
   first electrical terminal means respectively electrically connected to each said cathode;
   second electrical terminal means for each compartment for maintaining electrical contact with the individual strips of anode material during concurrent movement thereof relative to said cathodes; and
   means for interconnecting the first and second electrical terminals whereby the individual anode material-cathode cells constituted by each compartment and its respective cathode and anode material strips may be serially or parallel connected to an electrical load.

2. An electrochemical power supply as set forth in claim 1 in which said strips of anode material are secured to and carried by an elongate tape of insulating material, said strips being positioned in spaced parallel relation extending longitudinally of the tape on one face thereof.

3. An electrochemical power supply as set forth in claim 2 in which said housing comprises a pair of separable sections and the compartments are formed by dividing walls having seals at interfaces with portions of the tape between said strips.

4. An electrochemical power supply as set forth in claim 1 in which the porous anode material also includes particles of the electrolyte in solid form.

5. An electrochemical power supply as set forth in claim 1 in which the cathode comprises a catalyst for reducing oxygen molecules to four hydroxyl ions.

6. An electrochemical power supply as set forth in claim 5 in which the total developed area of the anode material in contact with the aqueous electrolyte is at least equal to or greater than that of the cathode in contact with the aqueous electrolyte, the thickness of said cathode being not substantially greater than approximately 25 mils, the thickness of the anode material being not substantially greater than approximately 100 mils.

7. An electrochemical power supply as set forth in claim 1 in which the total projected area of the anode material in contact with said electrolyte is at least equal to the total projected area of the cathode in contact with said electrolyte, and the total developed area of the anode material in contact with the electrolyte is at least equal to or greater than that of the cathode in contact with the electrolyte.

8. An electrochemical power supply as set forth in claim 7 in which the anode comprises a metal selected from the group consisting of zinc, cadmium, cobalt, iron, vanadium, chromium, molybdenum and tungsten, and in which the cathode comprises a platinum type catalytic material.

9. An electrochemical power supply as set forth in claim 1 in which air is supplied to said opposite cathode surface at a pressure at least equal to ambient atmospheric pressure.

10. An electrochemical power supply comprising:
a housing having at least one compartment including a body of aqueous electrolyte;
said compartment having positioned therein an electrically conductive cathode permeable to the passage of air and oxygen therethrough while being substantially impermeable to the passage of electrolyte, said cathode having a surface in electrolytic contact with said electrolyte and an opposite surface exposed to oxygen-containing gas, said compartment having passages to provide a supply of oxygen-containing gas to an opposite surface of said cathode;
a supply of elongate electrically conductive porous anode material having at least one surface adapted for electrolytic contact with said electrolyte and spaced away from the first said cathode surface, said anode material being secured to a surface of a carrier member of insulating material slotted throughout its length;
means for moving the carrier member with an opposite surface thereof in sliding contact with a wall of said compartment whereby said anode material is moved relative to said cathode and through said aqueous electrolyte;
first electrical terminal means respectively electrically connected to said cathode; and
second electrical means comprising a brush mounted in said wall and aligned with the slot of said carrier for maintaining electrical contact with the anode material during movement thereof relative to said cathode.

11. An electrochemical power supply as set forth in claim 10 in which said anode material is generally T-shaped in transverse cross section, the leg of the T being located in said carrier slot.

12. An electrochemical power supply comprising:
a housing having a plurality of compartments, each of said compartments including a body of aqueous electrolyte;
each of said compartments having positioned therein an electrically conductive cathode permeable to the passage of air and oxygen therethrough while being substantially impermeable to the passage of electrolyte, said cathode having a surface in electrolytic contact with said electrolyte, each compartment having passages to provide a supply of oxygen-containing gas to an opposite surface of the cathode, said cathode comprising a platinum type catalytic material for reducing oxygen molecules to four hydroxyl ions, the thickness of said cathode being not substantially greater than approximately 25 mils;
a supply of a plurality of elongate electrically conductive porous strips of anode material, each strip having at least one surface adapted for electrolytic contact with said body of electrolyte in a respective compartment and being spaced away from the respective cathode in that compartment, the thickness of the anode material being not substantially greater than approximately 100 mils, the total projected area of the anode material in contact with said electrolyte being at least as great as the total projected area of the cathode in contact with said electrolyte, the total developed area of the anode in contact with the electrolyte being at least approximately ten times that of the cathode in contact with the electrolyte, said strips of anode material being secured in spaced parallel relation to a surface of an elongate flexible carrier member of insulating material, said strips extending longitudinally of the carrier, said carrier having a plurality of longitudinal slots underlying respectively the strips of anode material;
means for concurrently moving the carrier member with an opposite surface in sliding contact with respective walls of said compartments whereby said strips of anode material are moved relative to said respective cathodes and bodies of aqueous electrolyte in said respective compartments;
first electrical terminal means respectively electrically connected to each said cathode;
second electrical terminal means comprising a brush mounted in each said wall and aligned respective carrier slots for maintaining electrical contact with the individual strips of anode material during concurrent movement thereof relative to said cathodes; and
means for interconnecting the first and second electrical terminals whereby the individual anode material-cathode cells constituted by each compartment and its respective cathode and anode material strips may be serially or parallel connected to an electrical load.

References Cited

UNITED STATES PATENTS

| | | | |
|---|---|---|---|
| 2,925,455 | 2/1960 | Eidensohn et al. | 136—86 |
| 3,260,620 | 7/1966 | Gruber | 136—6 |
| 3,293,080 | 12/1966 | Gruber et al. | 136—83 |

WINSTON A. DOUGLAS, *Primary Examiner.*

C. F. LE FEVOUR, *Assistant Examiner.*

U.S. Cl. X.R.

136—24, 86